United States Patent
Schmookler

(10) Patent No.: US 8,429,217 B2
(45) Date of Patent: Apr. 23, 2013

(54) EXECUTING FIXED POINT DIVIDE OPERATIONS USING A FLOATING POINT MULTIPLY-ADD PIPELINE

(75) Inventor: Martin Stanley Schmookler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 12/129,066

(22) Filed: May 29, 2008

(65) Prior Publication Data

US 2008/0275931 A1    Nov. 6, 2008

Related U.S. Application Data

(63) Continuation of application No. 11/055,042, filed on Feb. 10, 2005, now abandoned.

(51) Int. Cl.
*G06F 7/44* (2006.01)

(52) U.S. Cl.
USPC .......................... 708/504; 708/495; 708/501

(58) Field of Classification Search .................. None
See application file for complete search history.

(56) References Cited

U.S. PATENT DOCUMENTS

| | | | |
|---|---|---|---|
| 3,733,477 A | 5/1973 | Tate et al. | |
| 3,828,175 A | 8/1974 | Amdahl et al. | |
| 4,594,680 A | 6/1986 | Schomburg et al. | |
| 4,707,798 A * | 11/1987 | Nakano | 708/654 |
| 4,999,801 A * | 3/1991 | Katsuno | 708/500 |
| RE33,629 E | 7/1991 | Palmer et al. | |
| 5,046,038 A | 9/1991 | Briggs et al. | |
| 5,177,703 A | 1/1993 | Mori | |
| 5,249,149 A | 9/1993 | Cocanougher et al. | |
| 5,272,660 A | 12/1993 | Rossbach | |
| 5,309,383 A | 5/1994 | Kuroiwa | |
| 5,357,455 A | 10/1994 | Sharangpani et al. | |
| 5,515,308 A | 5/1996 | Karp et al. | |
| 5,563,818 A | 10/1996 | Agarwal et al. | |
| 5,737,255 A | 4/1998 | Schwarz | |
| 5,764,555 A | 6/1998 | McPherson et al. | |

(Continued)

OTHER PUBLICATIONS

Fowler, D.L. et al., "An Accurate, High Speed Implementation of Division by Reciprocal Approximation", Computer Arithmetic, 1989, Proceedings of 9th Symposium on , vol., No., Sep. 6-8, 1989, pp. 60-67.

(Continued)

*Primary Examiner* — Michael D Yaary
(74) *Attorney, Agent, or Firm* — Stephen J. Walder, Jr.; Diana R. Gerhardt

(57) ABSTRACT

A mechanism for executing fixed point divide operations using a floating point multiply-add pipeline are provided. With the mechanism, the floating point execution unit in a processor is modified to include elements that may be used to perform fixed point divide operations. These additional elements include a leading zero counter, a leading one counter, an estimate table unit, and a state machine. The fixed point divide operands are converted to a floating point format and an estimate of the reciprocal of the divisor is generated using estimate tables. These values are used in multiple passes through the floating point unit for calculating estimates of the quotient and corresponding error values. The estimates of the quotient are based on previous estimates of the quotient in a prior pass through the floating point unit and a corresponding error value. The final quotient estimate is truncated.

13 Claims, 5 Drawing Sheets

U.S. PATENT DOCUMENTS

| | | | |
|---|---|---|---|
| 5,784,307 | A | 7/1998 | Sheaffer |
| 6,047,305 | A | 4/2000 | Yano |
| 6,061,781 | A | 5/2000 | Jain et al. |
| 6,317,772 | B1 | 11/2001 | Carlson |
| 6,487,575 | B1 | 11/2002 | Oberman |
| 6,671,796 | B1 | 12/2003 | Sudharsanan et al. |
| 6,847,985 | B1 | 1/2005 | Gupta et al. |
| 6,963,645 | B2 | 11/2005 | Chen et al. |
| 2003/0050948 | A1 | 3/2003 | Okawa |
| 2004/0167956 | A1 | 8/2004 | Vihriala |
| 2004/0230634 | A1 | 11/2004 | Busaba et al. |
| 2005/0027775 | A1 | 2/2005 | Harrison et al. |
| 2006/0179092 | A1 | 8/2006 | Schmookler |

OTHER PUBLICATIONS

Ito, Masayuki et al., "Efficient Initial Approximation and Fast Converging Methods for Division and Square Root", Computer Arithmetic, 1995, Proceedings of the 12th Symposium on, vol., No., Jul. 19-21, 1995, pp. 2-9.

Markstein et al., "Integer Divide and Remainder Operations in teh IA-64 Architecture", Proceedings of the Fourth International Conference on Numbers and Computing, pp. 161-184, Apr. 2000.

U.S. Appl. No. 11/055,042, Image File Wrapper printed Apr. 17, 2012, 1 page.

* cited by examiner

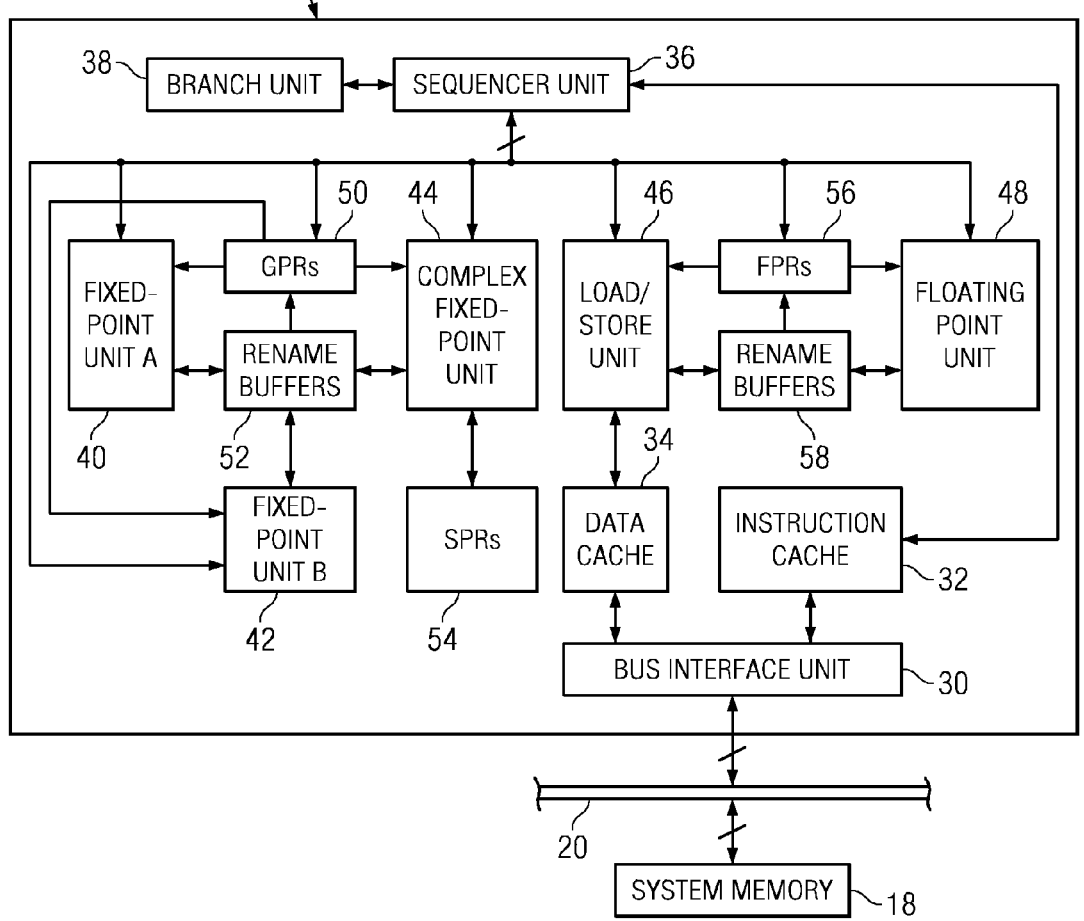

| PASS | OPERATION | COMMENT |
|---|---|---|
| 1 | fcvt (B)<br>fcvt (A)<br>y0 = ~1/b | CONVERT B to b<br>CONVERT A to a<br>14 BITS PRECISION |
| 2 | e = 1 - b*y0<br>q0 = a*y0 | 14 BITS |
| 3 | e2 = 1 + e*e<br>y1 = y0 + y0*e<br>q1 = q0 + q0*e | 28 BITS<br>28 BITS |
| 4 | y2 = y1*e2<br>r = a - b*q1 | 56 BITS |
| 5 | p = r*y2 | |
| 6 | q2 = p + q1 * (1 + d70) | d70 = 2**-70 |
| 7 | Q = TRUNCATE(q2)) | |

EXECUTING FIXED POINT DIVIDE OPERATIONS USING A FLOATING POINT MULTIPLY-ADD PIPELINE

This application is a continuation of application Ser. No. 11/055,042, filed Feb. 10, 2005, now abandoned.

BACKGROUND OF THE INVENTION

1. Technical Field

The present invention relates generally to an improved data processing system and method. In particular, the present invention provides a system and method for executing fixed point divide operations using a floating point multiply-add pipeline.

2. Description of Related Art

High performance computations in modern processors can be achieved through a number of architectural features. One such feature is the pipelined floating point execution units which allow several operations to take place in parallel. For example, fused floating-point multiply-add instructions allow two basic floating-point operations to be performed with a single rounding error.

To increase the speed and efficiency of real-number computations, floating point execution units in typical computers represent real numbers in a binary floating point format. In this format, a real number has three parts, a sign, a mantissa, and an exponent. The sign is a binary value that identifies whether the number is positive or negative. The mantissa is the numeric value which is multiplied by a base or radix raised to the power of the exponent, e.g., the mantissa of 145,000 is 145 ($145 \times 10^3$). The mantissa is represented as a one bit binary integer and a binary fraction. The one bit binary integer is often not represented but is instead an implied value. The exponent is a binary integer that represents the base-2 power that the mantissa is raised to.

In most cases, the floating point execution unit represents real numbers in normalized form. This means that, except for zero, the mantissa is always made up of an integer of 1 and the fraction 1.fff . . . ff. For example, the normalized mantissa of the single precision representation for the ordinary decimal number 178.125 is represented by the floating point execution unit as 01100100010000000000000 (with the "1." implied). For values less than 1, leading zeros are eliminated. For each leading zero that is eliminated, the exponent is decremented by one, resulting in an exponent with a negative value.

The floating point execution unit represents exponents in a biased form. This means that a constant is added to the actual exponent so that the biased exponent is always a positive number or zero, even when its value is negative. The value of the biasing constant depends on the number of bits available for representing exponents in the floating point format being used, which depends upon which precision is used. The biasing constant is chosen so that the smallest normalized number can be reciprocated without overflow. In the above example, the biased single precision exponent for the decimal number 178.125 is represented as 10000110. Thus, in scientific notation, the number 178.125 is the combination of the normalized mantissa and the biased exponent, i.e. $1.011001000E_2 10000110$.

While the floating point execution unit is used to execute floating point instructions, modern computers make use of fixed point units for executing fixed point or integer based instructions. In most modern processors, for example, fixed point divide instructions, also referred to as integer divide instructions, are usually implemented using a specialized custom design sub-unit within a fixed point unit. This specialized sub-unit requires additional area and power for the processor architecture. Frequently, these designs also have very long latency for large operands, such as for 64 bit operands, in order to keep the additional area small.

It would be beneficial to have a hardware based mechanism for executing fixed point divide instructions in such a way that the high performance obtained from floating point execution units may also be achievable when executing fixed point divide instructions. In addition, it would be beneficial to have a hardware based mechanism for executing fixed point divide instructions that reduces the required amount of area and power for the processor architecture.

SUMMARY OF THE INVENTION

The present invention provides a system and method for executing fixed point divide operations using a floating point multiply-add pipeline. With the present invention, the floating point execution unit in a processor is modified to include elements that may be used to perform fixed point divide operations. These modified elements include a leading zero counter, a leading one counter, an estimate table unit, and a state machine.

Some of these elements may already be present in a known floating point execution unit architecture, but are modified and enhanced by the present invention to include additional functionality not provided in known floating point execution units. For example, while a floating point execution unit may already have a state machine for executing floating point divide and square root instructions, this state machine is enhanced by the present invention to provide a new set of state in the state machine where each state corresponds to a particular fused-multiply-add/subtract instruction. Similarly, even though a known floating point execution unit may have a lookup table unit, the present invention enhances this lookup table unit to provide for estimating the reciprocal of a divisor of an integer divide instruction.

With the present invention, the fixed point divide operands are converted to a floating point format in the floating point execution unit using the leading zero and/or leading one counter. The leading zero and/or leading one counter are used along with the alignment shifter of the floating point execution unit to shift the data so that the mantissa of the floating point formatted data is in a known position which can then be sent to a table lookup unit to obtain an estimate of the reciprocal of the divisor. The mantissa itself is sent through the normalizer to obtain the divisor value. The numerator is obtained in a similar way but does not use the table lookup mechanism. The exponents for the divisor and the reciprocal of the divisor are calculated from the leading zero and/or leading one counter values.

These values are used in multiple passes through the floating point unit for calculating estimates of the quotient and corresponding error values. The estimates of the quotient are based on previous estimates of the quotient in a prior pass through the floating point unit and a corresponding error value. The final quotient estimate is truncated to provide a fixed point formatted result.

The state machine provides the necessary control signals for performing the operations for generating the estimates of the reciprocal of the divisor and the quotient and error values. The state machine includes a plurality of states which correspond to a particular fused-multiply-add/subtract operation. The other elements of the floating point unit are used to actually perform the operations necessary during each pass of the floating point unit pipeline to ultimately generate a fixed point formatted quotient value.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary block diagram of a processor in which an exemplary embodiment of the present invention may be implemented;

FIGS. 3B-1 and 3B-2 are high level block diagrams of the floating point execution unit in accordance with exemplary embodiments of the present invention;

DETAILED DESCRIPTION OF THE PREFERRED EMBODIMENT

Figures 1, 3B:
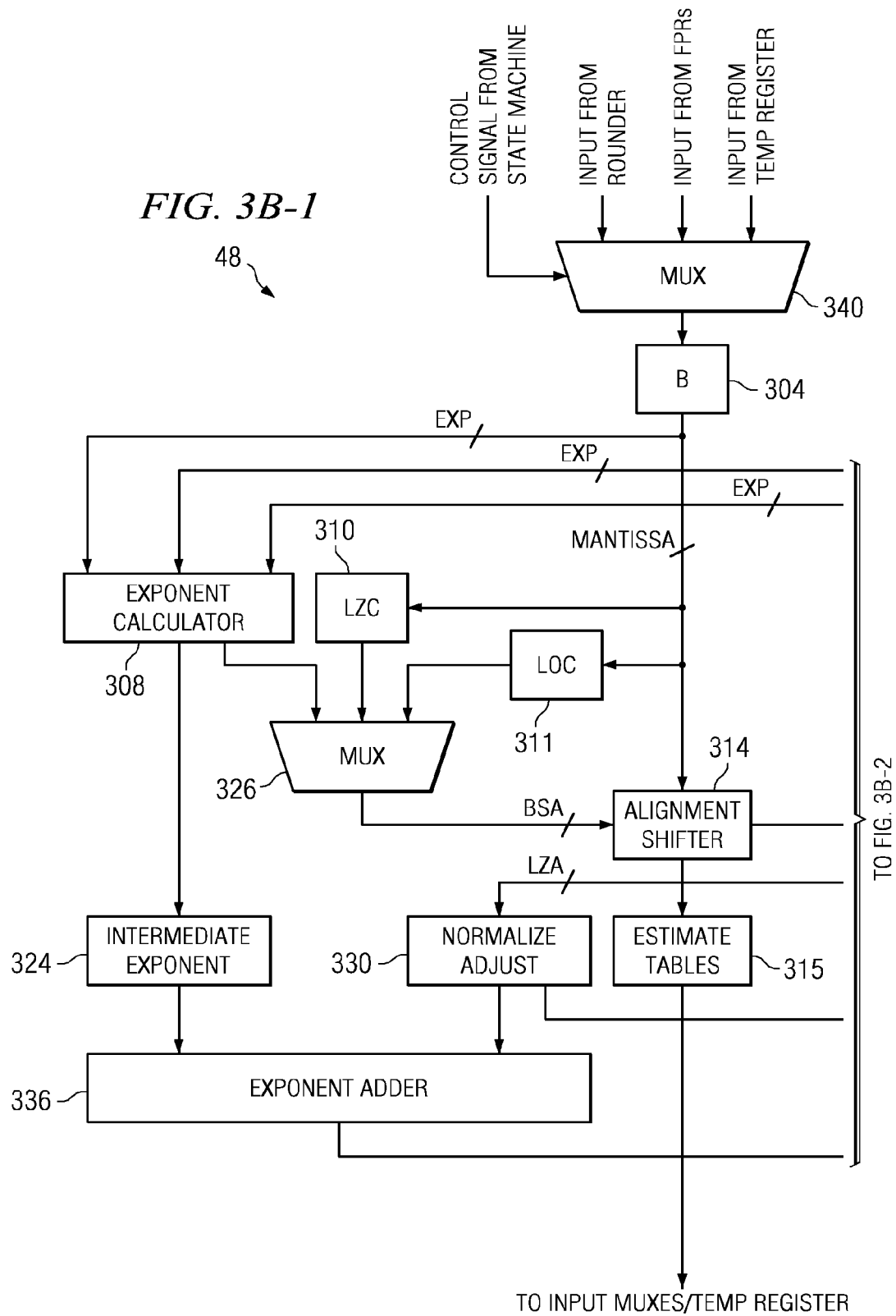
Figures 2, 3B:
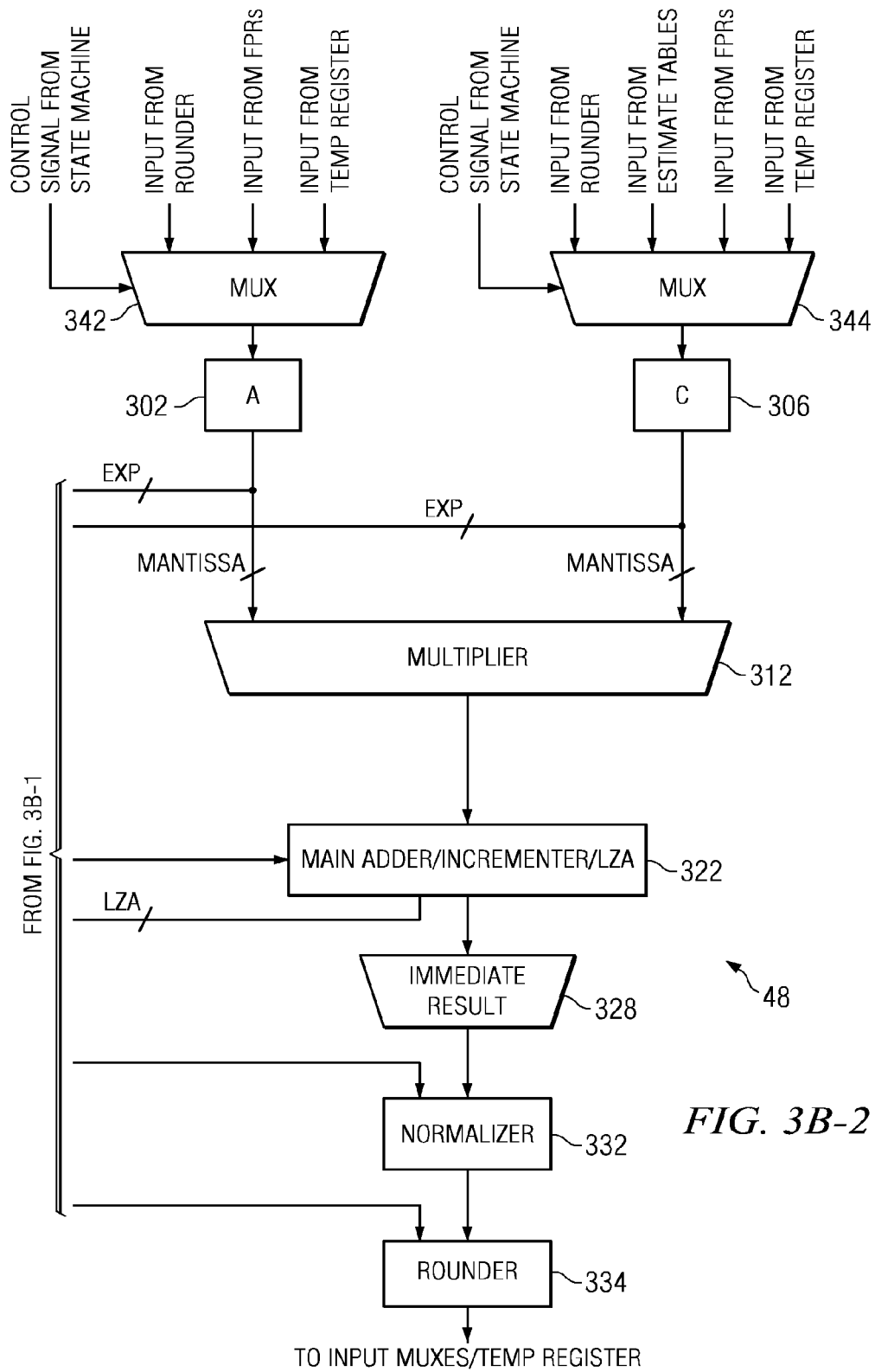

As mentioned above, the present invention is directed to an improvement in the floating point execution unit, or floating point unit, of a processor so that fixed point divide operations may be performed by the floating point execution unit. One exemplary architecture in which the present invention may be implemented is the PowerpC™ microprocessor architecture. FIG. 1 is provided as an illustrative embodiment of a processing unit architecture for a PowerPC™ microprocessor manufactured by International Business Machines Corporation. It should be appreciated that the architecture shown in FIG. 1 is only exemplary and is not intended to state or imply any limitation as to the architectures in which the present invention may be implemented. Many modifications to the architecture shown in FIG. 1 may be made without departing from the spirit and scope of the present invention.

PowerPC™ microprocessor 12 operates according to reduced instruction set computing (RISC) and is a single integrated circuit superscalar microprocessor. The system bus 20 is connected to a bus interface unit (BIU) of microprocessor 12. Bus 20, as well as various other connections described, include more than one line or wire, e.g., the bus could be a 32-bit bus.

BIU 30 is connected to an instruction cache 32 and a data cache 34. The output of instruction cache 32 is connected to a sequencer unit 36. In response to the particular instructions received from instruction cache 32, sequencer unit 36 outputs instructions to other execution circuitry of microprocessor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand data from general-purpose registers (GPRs) 50 and fixed-point rename buffers 52. The outputs of FXUA 40, FXUB 42, CFXU 44 and LSU 46 send destination operand data for storage to selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in rename buffers 58.

Microprocessor 12 may include other registers, such as configuration registers, memory management registers, exception handling registers, and miscellaneous registers, which are not shown. Microprocessor 12 carries out program instructions from a user application or the operating system, by routing the instructions and data to the appropriate execution units, buffers and registers, and by sending the resulting output to the system memory device (RAM), or to some output device such as a display console.

The present invention is directed to improving the manner by which fixed point divide instructions are processed within a processor device. In particular, the present invention improves a floating point unit of a processor architecture such that fixed point divide operations may be performed using the floating point unit, such as floating point unit 48. The representation of floating point values and the floating point operations are defined in the IEEE Standard 754-1985, "IEEE Standard for Binary Floating-Point Arithmetic." The standard describes both single and double precision values, and also provides for other precisions such as double-extended.

Exemplary embodiments of the present invention are directed to a mechanism for processing fixed point divide instructions using a floating point unit. In an exemplary embodiment, the mechanisms of the present invention may be implemented, for example, in, or in association with, floating point execution unit 48, which is a multiply-add pipelined unit. However, with the present invention, the multiplier in the floating point execution unit 48 is designed to also support pipelined execution of fixed point multiply instructions. Therefore, the multiplier in the floating point execution unit of one exemplary embodiment of the present invention is a 64-bit by 64-bit multiplier. In addition, the alignment shifter and normalizer are also made wider to accommodate the larger operands. Extra registers may also be provided to hold intermediate results of the original operands.

The operations performed in hardware by the present invention are based on a software algorithm published by Peter Markstein et al. in "Integer Divide and Remainder Operations in the IA-64 Architecture," Proceedings of the Fourth International Conference on Numbers and Computing, pp. 161-184, April 2000, which is hereby incorporated by reference. In this article, Markstein et al. describe a software algorithm for performing integer divide operations using software floating-point instructions. The present invention adapts this algorithm described in Markstein so that it may be executed as a single fixed point instruction using a floating point unit. Moreover, the present invention provides hardware mechanisms for providing special operations for special cases of operands to thereby improve the efficiency of executing fixed point divide instructions.

The processing of a fixed point divide instruction using a floating point unit involves a sequence of special operations and floating point multiply-add operations. The floating point multiply-add operations convert the fixed point integer operands to floating point format, use a table to obtain an estimate of the reciprocal of the divisor, and obtain a floating point quotient of sufficient accuracy such that it can be truncated to the nearest integer value corresponding to the correct quotient. Special cases of operands may be detected to reduce the latency of the fixed point divide instruction processing. These special cases include, but are not limited to, when shorter precision is needed such as for 32 bit operands, when the divisor is a power of two, such as for division by 1 or 2, and the like.

Figures 2, 3A:
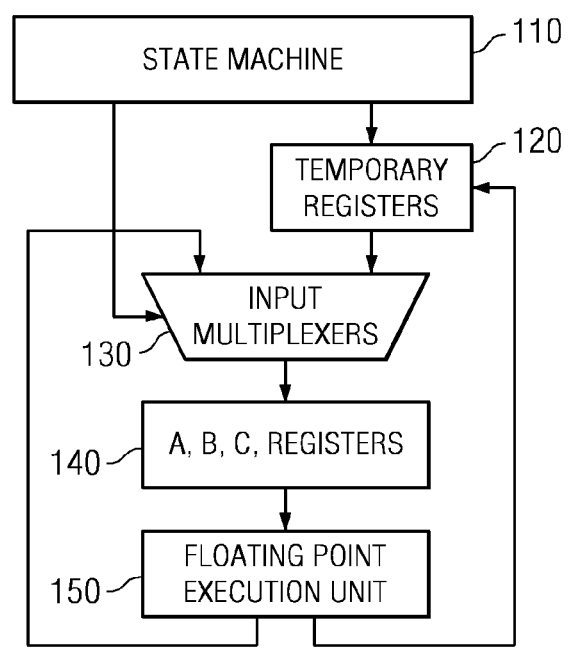
FIG. 2 is an exemplary diagram illustrating the algorithm implemented by the hardware of one exemplary embodiment of the present invention.
FIG. 3A is an exemplary block diagram illustrating the operation of the state machine, of one exemplary embodiment of the present invention, to control the inputs provided to the floating point unit to achieve the functionality of the present invention.

FIG. 2 is an exemplary diagram illustrating the algorithm implemented by the hardware of one exemplary embodiment of the present invention. The algorithm shown in FIG. 2 can be used for integer division of A/B. The algorithm uses a Taylor series approximation of the reciprocal of the divisor B. Each pass represents a group of independent operations which are only dependent upon the result from previous passes. The operations within a pass may be executed in any order, or even at the same time using more than one floating point execution unit. Results of one operation can be used in a subsequent operation during the next pass after p cycles, where p is the number of stages in the floating point unit pipeline.

In the algorithm shown in FIG. 2, the function "fcvt" is a function which converts a signed or unsigned integer to a floating point format. The function "truncate" is a function which rounds its argument down to the next integer value and then converts it to fixed point format. Uppercase "A" and "B" correspond to fixed point integer format operands and lowercase "a" and "b" correspond to floating point format operands. For all $|e|<2^{**}-14$, Ee is the error in the last quotient q due to e, Er is the error in the last quotient q due to rounding and y2.

The convert and estimate operations for the divisor b are essentially combined in the depicted algorithm. The estimate begins during the conversion of b, after shifting to determine the leading significant bits.

As shown in FIG. 2, in a first pass through the floating point unit pipeline, the B and A operands are converted to floating point format, a and b. In addition, an estimate y0 of the reciprocal of the divisor b is determined. The y0 value has a precision of 14 bits. In a second pass through the floating point unit pipeline, a first error value e is calculated as the difference between 1 and the product of b and the estimated reciprocal of b. A first estimate q0 of the quotient is then generated as the product of the numerator a and the estimated reciprocal of b. The q0 value has a precision of 14 bits.

In a third pass through the floating point unit pipeline, a second error value e2 is calculated as the sum of 1 and the product of e with itself. A second estimate y1 of the reciprocal is generated as the sum of y0 and the product of y0 and the first error value e. A second estimate of the quotient q1 is calculated as the sum of the first estimate q0 and the product of q0 and the first error value e. The y1 value and q1 value have precisions of 28 bits.

In a fourth pass through the floating point unit pipeline, a third estimate y2 of the reciprocal of b is generated as the product of the second estimate y1 and the second error value e2. This value has a precision of 56 bits. In addition, a remainder r is calculated as the difference between the numerator a and the product of the divisor b and the second estimate of the quotient q1. This remainder value r, although it is approximately equal to the product of the numerator a and the first error value e raised to the power of 2, also corrects for rounding errors in the calculation of q1.

In a fifth pass through the floating point unit pipeline, a product value p is calculated as the product of the remainder r and the third estimate of the reciprocal of the divisor b. In the sixth pass through the floating point unit pipeline, a third estimate of the quotient q2 is calculated as the sum of the p value and the product of the second estimate of the quotient q1, and the quantity of one plus 2 raised to the power of −70, i.e. d70.

In the seventh pass through the floating point unit pipeline, the final quotient value Q is calculated as the truncated q2 value. The error Ee due to the error in the initial estimation of the reciprocal is equal to minus e raised to the sixth power, i.e. $-(e^{**}6)$. The error Er due to rounding is equal to e raised to the second power multiplied by 2 raised to the −52 power.

The algorithm shown in FIG. 2 is executed in hardware of a floating point unit in accordance with exemplary aspects of the present invention. For some processors, such as the Intel IA64 processor which implements a full 64 bit fraction multiply-add unit, calculation of the q2 value can be combined with the p value as follows: $q2=q1+r^*y2$. Other ways of including d70 in the calculations may also be provided. This eliminates one pass thereby requiring only 6 passes rather than 7 passes through the floating point pipeline for completion of the instruction processing.

For 32 bit fixed point divide instructions, the r value is not needed and the processing of the fixed point divide instruction may end sooner, e.g., in five passes through the floating point unit pipeline. For example, the fourth and fifth passes through the pipeline may be as follows:

$$q2=q1*(e2+d40) \text{ where } d40=2^{**}-40 \quad\quad 4$$

$$Q=\text{truncate}(q2) \quad\quad 5$$

The use of a correction constant, referred to as "del", is one possible way of obtaining the properly truncated result. For the 64 bit divide case, del is the d70 value. For 32 bit divide, del is d40. The multiplier in the floating point unit includes an extra partial product which has various uses including allowing the addition of the correction constant. The value of the correction constant is actually relative to the integer bits of the multiplier. Therefore, in the operation for calculating q2, p is used as the addend, and q1 is forced through the multiplier, so that d70 aligns with q1.

Since the error due to the estimate must be negative, a positive error is ensured by adding a value, del, which has the following constraint: $|del|>|Ee|+|Er|$. Using the absolute values of a and b, the requirement that $q2<(a+1)/b$ does not round to the next higher integer quotient is ensured with the following constraint: $|del|<1/b-|Er|$. Since the largest b for a 64 bit fixed point divide instruction is less than $2^{}64$, d70 must be smaller than $2^{}-64$. Similarly, d40 must be smaller than $2^{**}-32$.

As discussed above, the present invention implements the algorithm set forth in FIG. 2 above in hardware of the processors of a data processing system. The various operations shown in FIG. 2 may be implemented using a small state machine that outputs required control signals for each change of state. These control signals mimic the operations shown in FIG. 2. The conversion of the fixed point divide operands to floating point format makes use of a leading zero counter in the floating point unit for positive and unsigned integers, and a leading one counter in the floating point unit for negative integers. The counter values are complemented and then used for the alignment shifter which shifts the divisor to the right. This guarantees that the most significant bit will be in the $64^{th}$ bit position. The leading significant bits can be sent to a table lookup unit in the floating point unit to thereby generate an estimate of the reciprocal of the divisor b. For example, if there are 26 leading zeros, the complement of 26 is (63−26) =37. In this case, the divisor is shifted 37 places, so there are 63 leading zeros.

FIG. 3A is an exemplary block diagram illustrating the operation of the state machine, of one exemplary embodiment of the present invention, to control the inputs provided to the floating point unit to achieve the functionality of the present invention. As shown in FIG. 3A, the floating point execution unit 150 receives operand inputs A, B and C from operand registers 140. The operand registers 140 receive data inputs from input multiplexers 130. The input multiplexers 130, one for each of the A, B and C registers, receive a number of data inputs which are multiplexed and one of each of the data inputs is output by each input multiplexer 130 based on control signals received from state machine 110.

The data inputs to the input multiplexers 130 include the output from an estimate table unit in the floating point execution unit 150, an output from a rounder of the floating point execution unit 150, constant data values from temporary registers 120, and previously stored values from the temporary registers 120. In addition, although not shown, since the floating point execution unit also operates in its normal capacity to execute floating point instructions, the operands for a floating point execution unit may also be provided such that the floating point execution unit 150 may operate in a normal capacity as well as perform fixed point divide operations in accordance with the present invention.

The state machine 110 is established such that when a fixed point divide instruction is to be executed by the floating point execution unit 150, the state machine 110 sends control signals to the input multiplexers 130 to implement the algorithm shown in FIG. 2. Based on control signals from the state machine 110, the temporary registers 120 output constant and/or previously stored values, such as from previous stages of the algorithm, to the input multiplexers 130. In addition, the control signals from state machine 110 control which inputs to the input multiplexers 130 are output to the A, B and C registers for use by the floating point execution unit 150.

The floating point execution unit 150 then operates on the operand values stored in A, B and C registers to perform either a fused-multiply-add or fused-multiply-subtract operation. Referring again to the algorithm shown in FIG. 2, it can be seen that the operations in each stage of the algorithm may be characterized as either a fused-multiply-add or fused-multiply-subtract operation, described hereafter. Thus, by carefully selecting the input operands A, B and C to the floating point execution unit 150 using the state machine 110, the operations of the algorithm may be performed using the floating point execution unit 150.

When the floating point execution unit 150 completes operation on the input operands A, B, and C, the results are fed back into the input multiplexers 130. In addition, the results may be stored in temporary registers 120 for use in a later stage of the algorithm or for output as the final result of the fixed point divide instruction execution. The state machine 110 then transitions to the next state in order to execute the next operation of the algorithm shown in FIG. 2.

FIGS. 3B-1 and 3B-2 are high level block diagrams of the floating point execution unit in accordance with an exemplary embodiment of the present invention. As shown in FIGS. 3B-1 and 3B-2, floating point execution unit 150 includes input operand registers 302, 304, and 306 for receiving operands A, B, and C, respectively. Floating point execution unit 150 uses these operands when executing the "fused-multiply-add" and "fused-multiply-subtract" instructions. The fused-multiply-add instruction executes the arithmetic operation (A*C)+B, while the fused-multiply-subtract instruction executes the arithmetic operation (A*C)−B. The exponent portions of operands A, B, and C are provided to exponent calculator 308. The mantissa portions of operands A and C are provided to multiplier 312, while the mantissa portion of operand B is provided to alignment shifter 314, leading zero counter (lzc) 310, and leading one counter (loc) 311.

Multiplier 312 receives the mantissas of operands A and C and reduces the arithmetic function (A*C) to the sum of two intermediate results, known as "sum" and "carry." These intermediate results are provided to main adder/incrementer/ leading zero anticipator (LZA) 322. Exponent calculator 308 calculates an intermediate exponent from the sum of the exponents of operands A and C and stores the intermediate exponent in intermediate exponent register 324. Exponent calculator 308 also calculates the difference between the intermediate exponent and the exponent of operand B and provides the difference value as an input to multiplexer 326.

The multiplexer 326 multiplexes the exponent difference from the exponent calculator 308, a complement of the lzc 310 count, and a complement of the loc 311 count. A select signal is provided for selecting one of these inputs as the operand B shift amount (BSA) which is used by the alignment shifter 314 to shift the mantissa of operand B.

The shifted mantissa of operand B is then provided to main adder/incrementer/LZA 322 and estimate tables unit 315. Main adder/incrementer/LZA 322 adds the shifted mantissa of operand B to the sum and carry results of multiplier 312 to generate an intermediate result of the fused-multiply-add/ subtract instruction. The output of main adder/incrementer/ LZA 322 is stored in intermediate result register 328. In addition, the leading zero anticipator (LZA) of the main adder/incrementer/LZA 322 outputs data indicative of the anticipated number of leading zeros to normalize adjust register 330.

When the instruction and signs determine that operand B is to be effectively subtracted from AC, the alignment shifter also complements B. If, in this case, B is also greater than AC, then the result from the adder/incrementer/LZA 322 must be recomplemented.

The LZA is placed into normalize adjust register 330 to be used by the normalizer 332 to normalize the intermediate result from intermediate result register 328. Normalization involves shifting of the intermediate result based on the normalizer adjust to eliminate leading zeros. The exponent adder 336 also uses the normalizer adjust to adjust the intermediate exponent 324 to be consistent with the normalized intermediate result generated by normalizer 332. The results of the exponent adder 336 and the normalizer 332 are provided to rounder 334 for rounding in accordance with a specified rounding mode. The rounder 334 may also perform fine adjustment of the exponent from exponent adder 336, such as incrementing it when rounding causes a carry out of the integer bit of the mantissa. The rounded result from rounder 334 is then provided back to the input multiplexers 340-344 and may also be provided to temporary registers for temporary storage.

The estimate tables unit 315 receives the shifted mantissa of B and uses the leading significant bits of this value to perform a lookup of an estimate for the reciprocal of the operand B. The value from the estimate tables may then be output to the input multiplexer 344.

The input multiplexers 340-344 receive the output from the rounder 334 and outputs from temporary registers while the state machine determines which of these values are to be provided as the A, B and C operands for a next pass through the floating point unit pipeline. The output from the temporary registers may include, for example, predetermined constant values stored in the temporary registers, values generated in previous passes through the floating point execution unit pipeline, and the like. In addition, the input multiplexer 344 receives the output from the estimate tables unit 315. The input multiplexers 340-344 select one of these inputs to be output as a corresponding operand A, B or C based on control signals received from the state machine 110. These control signals mimic the operations listed in FIG. 2. In this way, the combination of the state machine 110 and the other elements of the floating point unit 150 provide a mechanism for executing a fixed point divide instruction in a floating point unit.

With hardware algorithms such as that described above, it is easy to detect special cases and finish the fixed point divide instruction execution early. Exactly how early depends on which special cases are detected and when they are detected.

Some special cases may result in the fixed point divide instruction execution being completed in one pass of the floating point unit pipeline. For example, operands of + or − zero may be detected immediately in the execution unit for most operands. If either or both operands are zero, then the result is either immediately known or is undefined. For such cases, the execution of the fixed point divide instruction is ended immediately and a known result is returned.

It is also feasible to execute in one pass the cases where the divisor B is + or −1. The leading zero counter 310 may share circuitry with that for detecting that B is zero. If it counts exactly 63 leading zeroes rather than 64, then the divisor B must be +1. As a result, operand A may be output in its original integer form. If the leading one counter determines that B is all ones, which is equal to −1, then the twos complement of numerator A may be output in its original form. However, if the three pass cases described hereafter are implemented, then division by 1 may instead be included as a special case of division by a power of 2.

Some special cases may be completed in three passes through the floating point unit pipeline. For example, division by a power of 2 may result in the execution of the fixed point divide instruction being finished in three passes. If the divisor B is a power of 2, then the converted floating point number b must have a fraction of all zero, which is also detected by the same circuit that detects an operand of zero. The calculated reciprocal y0 would have the correct exponent, but its mantissa can easily be forced to 1.0. Then q0, calculated in pass 2, would be exact, and the execution can branch directly to the last pass which truncates and converts q0 to the integer format Q.

For example, assume that the numerator A is 30 and the divisor B is 8. The divisor would be converted to a floating point format b=1.0*(2**3) and y0 would be calculated as y0=0.99997*(2**−3), allowing for 14 bit precision. However, when b is determined to have a fraction of all 0, y0 is forced to 1.0*(2**−3). Similarly, A is converted to a=1.875* (2**4). Then q0 becomes q0=a*y0=1.875*(2**4)*1.0* (2**−3)=1.875*(2**1) which converts to 3.75. As a result, Q is the truncated value 3.

Other special cases may be included for detection and early completion without departing from the spirit and scope of the present invention. In this way, the execution of fixed point divide instructions using known numerators and/or divisors may be made more efficient.

Figure 4:
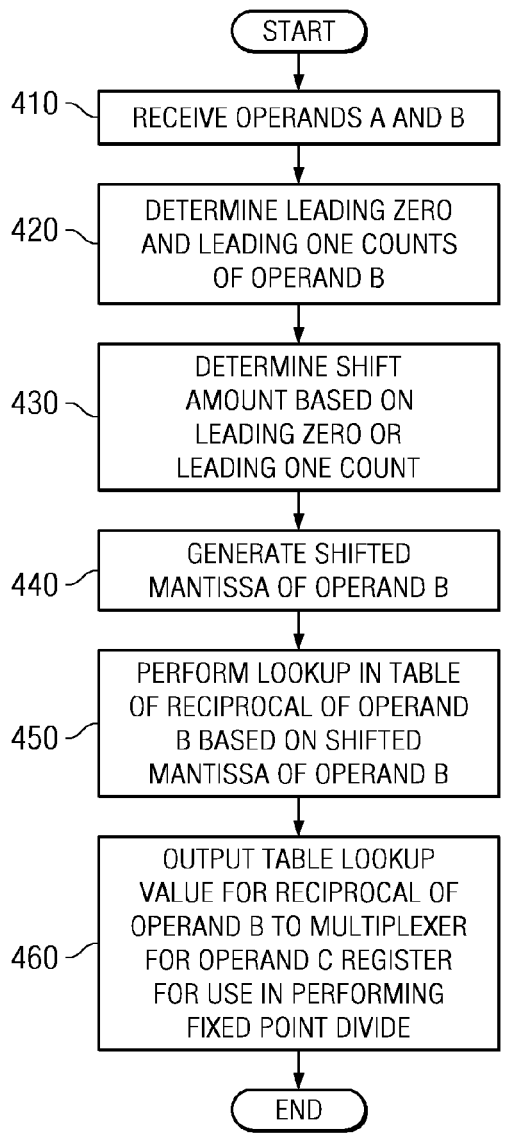
FIG. 4 is a flowchart outlining an exemplary operation of the present invention when generating an estimate of the reciprocal of the divisor of a fixed point divide instruction.

FIG. 4 is a flowchart outlining an exemplary operation of the present invention when generating an estimate of the reciprocal of the divisor of a fixed point divide instruction. As shown in FIG. 4, the operation starts by receiving the operands of the fixed point divide instruction (step 410). A leading zero and leading one count are determined for the mantissa of operand B (step 420). A shift amount for the mantissa of operand B is determined based on the leading zero count or leading one count (step 430). The shifted mantissa of operand B is then generated (step 440) and a lookup of the reciprocal of operand B is performed in an estimate table based on this shifted mantissa of operand B (step 450). The table lookup value for the reciprocal of operand B is then output to the floating point registers for use in performing the other operations necessary to complete execution of the fixed point divide instruction using the floating point execution unit (step 460).

Figure 5:
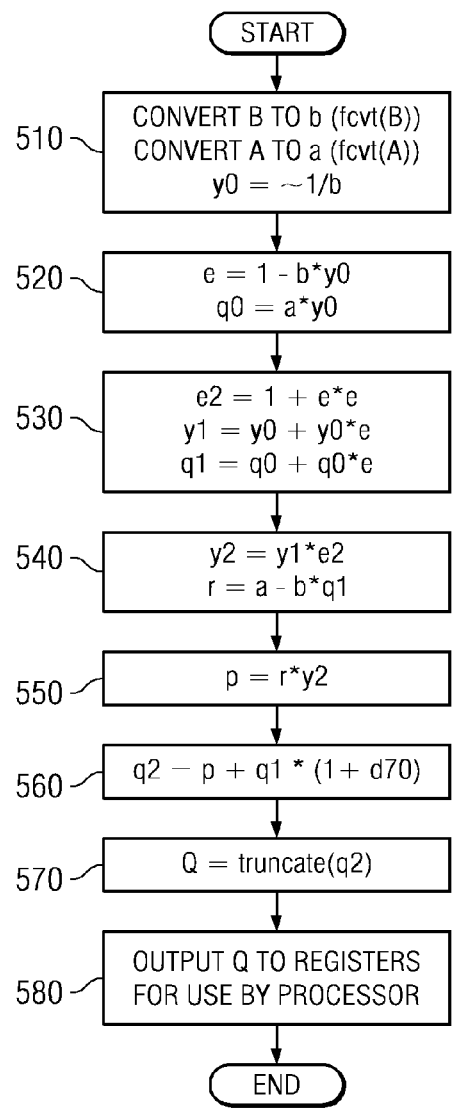
FIG. 5 is a flowchart outlining the overall set of operations performed by an exemplary embodiment of the present invention to execute a fixed point divide instruction in a floating point execution unit.

FIG. 5 is a flowchart outlining the overall set of operations performed by an exemplary embodiment of the present invention to execute a fixed point divide instruction in a floating point execution unit. The steps shown in FIG. 5 correspond to the algorithm shown in FIG. 2. Each step of the flowchart in FIG. 5 corresponds to a pass through the floating point execution unit.

As shown in FIG. 5, operands B and A are converted to floating point format using the function fcvt( ). In addition, a first estimate of the value of the reciprocal of divisor b is generated (step 510). This step may be performed in a manner similar to that illustrated in FIG. 4, for example. Thereafter, a first error value e is calculated and the first estimate of the quotient q0 is calculated using the floating point execution unit (step 520). Then, a second error value e2, second estimate y1 of the reciprocal of the divisor b, and second estimate of the quotient q1 are calculated based on the values generated in step 520 (step 530).

Thereafter, using the values generated in step 530, a third estimate y2 of the reciprocal of the divisor b is generated and a remainder r is calculated using the floating point execution unit (step 540). A value p is calculated based on the values calculated in step 540 (step 550). Then, a third estimate of the quotient q2 is generated based on the p value calculated in step 550, the previous quotient estimate q1 and a correction value d70 (step 560).

Thereafter, the fixed point formatted quotient value Q is generated by truncating the previous quotient estimate q2 to an integer value (step 570). The Q value is then output to registers in the processor for use by other units within the processor (step 580). The operation then terminates.

Thus, the present invention provides mechanisms by which fixed point divide instructions may be executed in a floating point execution unit. The mechanisms of the present invention provide a state machine having a set of states that correspond to particular fused-multiply-add/subtract operations that may be performed in the floating point execution unit. In addition, the state machine provides corresponding control signals to elements of the floating point unit in order to perform these operations associated with the states of the state machine.

Moreover, mechanisms are provided within the floating point unit for converting fixed point divide instruction operands to a floating point format and for applying a correction constant to an intermediate result to thereby perturb the intermediate result up such that a final remainder calculation is eliminated and rounding to an exactly truncated quotient is simply formed by truncation. In some embodiments of the present invention, mechanisms are provided for identifying special divisors so that an early finish of the fixed point divide execution of the present invention is made possible.

The mechanisms of the present invention make use of a quadratically converging division algorithm for fixed point division that avoids a remainder comparison operation by perturbing the intermediate result. This perturbation is done in the hardware via the floating point execution unit's multiplier. Enough precision is gained through the calculation of a third estimate of the quotient q2 to avoid the use of 64 bit full multiply/add hardware. Rather, the present invention only uses a fused 64×64 bit multiply with a 56 bit addend.

Because the present invention permits the floating point execution unit to execute fixed point divide instructions, a separate sub-unit is not required within the fixed point unit of the processor. As a result, area and power requirements may be reduced. Moreover, latency in executing these types of instructions may be reduced.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a data processing system comprising a hardware implemented floating point execution unit, for executing a fixed point divide instruction using the floating point execution unit, comprising:
   receiving, in the floating point execution unit, operands of the fixed point divide instruction, wherein the operands include a numerator and a divisor;
   converting, in the floating point execution unit, the numerator and divisor to a floating point format;
   generating, in the floating point execution unit, an estimate of a reciprocal of the divisor; and
   determining a quotient for the fixed point divide instruction using the floating point formatted numerator, divisor and the estimate of the reciprocal of the divisor, wherein generating an estimate of the reciprocal of the divisor includes using an estimate table unit in the floating point execution unit to lookup an estimate of the reciprocal of the divisor, and wherein the lookup of the estimate of the reciprocal of the divisor in the estimate table unit is based on a shifted mantissa of the divisor, wherein determining a quotient for the fixed point divide instruction using the floating point formatted numerator, divisor and the estimate of the reciprocal of the divisor includes:
   making multiple passes through a pipeline of the floating point execution unit using results from a previous pass through the pipeline of the floating point execution unit, to generate estimates of the quotient for the fixed point divide instruction, wherein a final pass through the pipeline of the floating point execution unit involves truncating an estimate of the quotient to generate a final estimate of the quotient for the fixed point divide instruction.

2. The method of claim 1, wherein determining a quotient for the fixed point divide instruction using the floating point formatted numerator, divisor and the estimate of the reciprocal of the divisor includes using a quadratically converging division algorithm for fixed point division.

3. The method of claim 2, wherein the quadratically converging division algorithm is implemented using a state machine having states corresponding to fused-multiply-add/subtract operations that are to be performed by the floating point execution unit.

4. The method of claim 1, wherein determining a quotient for the fixed point divide instruction using the floating point formatted numerator, divisor and the estimate of the reciprocal of the divisor includes using a hardware state machine having states corresponding to fused-multiply add/subtract operations to be performed by the floating point execution unit to execute the fixed point divide instruction.

5. The method of claim 1, wherein converting, in the floating point execution unit, the divisor to a floating point format includes using one of a leading zero counter value and a leading one counter value to shift a mantissa of the divisor.

6. The method of claim 1, wherein determining a quotient for the fixed point divide instruction using the floating point formatted numerator, divisor and the estimate of the reciprocal of the divisor includes:
   determining if the divisor is associated with a special case for fixed point divide instructions; and
   ending the determination of the quotient for the fixed point divide instruction early if the divisor is associated with a special case for fixed point divide instructions.

7. A method, in a data processing system comprising a hardware implemented floating point execution unit, for executing a fixed point divide instruction using the floating point execution unit, comprising:
   receiving, in the floating point execution unit, operands of the fixed point divide instruction, wherein the operands include a numerator and a divisor;
   converting, in the floating point execution unit, the numerator and divisor to a floating point format;
   generating in the floating point execution unit an estimate of a reciprocal of the divisor; and
   determining a quotient for the fixed point divide instruction using the floating point formatted numerator, divisor and the estimate of the reciprocal of the divisor, wherein:
   generating an estimate of the reciprocal of the divisor includes using an estimate table unit in the floating point execution unit to lookup an estimate of the reciprocal of the divisor,
   the lookup of the estimate of the reciprocal of the divisor in the estimate table unit is based on a shifted mantissa of the divisor,
   determining a quotient for the fixed point divide instruction using the floating point formatted numerator, divisor and the estimate of the reciprocal of the divisor includes:
   determining if the divisor is associated with a special case for fixed point divide instructions; and
   ending the determination of the quotient for the fixed point divide instruction early if the divisor is associated with a special case for fixed point divide instructions, and wherein determining if the divisor is associated with a special case for fixed point divide instructions includes determining if the divisor is associated with one of when the divisor is a power of 2 or when the divisor is 1 or −1.

8. A system for executing a fixed point divide instruction using a floating point execution unit, comprising:
   one or more floating point registers; and
   a floating point execution unit coupled to the floating point registers, wherein the floating point execution unit receives operands of the fixed point divide instruction from the one or more floating point registers, wherein the operands include a numerator and a divisor, converts the numerator and divisor to a floating point format, generates an estimate of a reciprocal of the divisor, and determines a quotient for the fixed point divide instruction using the floating point formatted numerator, divisor and the estimate of the reciprocal of the divisor, wherein the floating point unit includes an estimate table unit, and wherein the floating point execution unit generates an estimate of the reciprocal of the divisor using the estimate table unit to lookup an estimate of the reciprocal of the divisor based on a shifted mantissa of the divisor, wherein the floating point execution unit determines a quotient for the fixed point divide instruction includes:

making multiple passes through a pipeline of the floating point execution unit using results from a previous pass through the pipeline of the floating point execution unit, to generate estimates of the quotient for the fixed point divide instruction wherein a final pass through the pipeline of the floating point execution unit involves truncating an estimate of the quotient to generate a final estimate of the quotient for the fixed point divide instruction.

9. The system of claim 8, wherein the floating point execution unit implements a quadratically converging division algorithm to determine a quotient for the fixed point divide instruction using the floating point formatted numerator, divisor and the estimate of the reciprocal of the divisor.

10. The system of claim 9, further comprising:
a state machine coupled to the floating point execution unit, wherein the quadratically converging division algorithm is implemented using the state machine, and wherein the state machine has states corresponding to fused-multiply-add/subtract operations that are to be performed by the floating point execution unit.

11. The system of claim 10, wherein the state machine implementing the quadratically converging division algorithm avoids a remainder comparison operation by providing a perturbation value to a multiplier of the floating point execution unit to perturb an intermediate result.

12. The system of claim 8, further comprising:
a hardware state machine, coupled to the floating point execution unit, having states corresponding to fused-multiply-add/subtract operations to be performed by the floating point execution unit to execute the fixed point divide instruction.

13. The system of claim 8, wherein the floating point execution unit includes a leading zero counter and a leading one counter, and wherein the floating point execution unit converts the divisor to a floating point format using one of a value from the leading zero counter and a value from the leading one counter to shift a mantissa of the divisor.

* * * * *